Dec. 16, 1969  C. G. SIMONS  3,484,516

METHOD OF MOLDING A TRANSPARENT TEAT CUP SHELL

Filed April 6, 1967

Inventor
Clifford G. Simons
By Andrus & Starke
Attorneys

United States Patent Office 3,484,516
Patented Dec. 16, 1969

3,484,516
METHOD OF MOLDING A TRANSPARENT TEAT CUP SHELL
Clifford G. Simons, Delavan, Wis., assignor to Sta-Rite Industries, Inc., Delavan, Wis., a corporation of Wisconsin
Filed Apr. 6, 1967, Ser. No. 628,975
Int. Cl. B29d 3/00; B29f 1/10; B29h 9/10
U.S. Cl. 264—254            1 Claim

ABSTRACT OF THE DISCLOSURE

The invention relates to a two-step molding process for making a teat cup shell for a milking apparatus. A portion of the shell is initially molded around an annular-shaped weight to partially imbed the weight and then the initially molded portion of the shell is employed to support and align the weight within the mold cavity for a second stage molding operation. As the shell is formed of a thermoplastic material, the heat of the liquid thermoplastic resin in the second molding stage will contact and tend to melt the thermoplastic of the first molded section along the interface to thereby provide a fused or welded joint between the two separately molded sections.

---

The conventional teat cup for a milking machine includes an outer rigid shell generally fabricated of stainless steel, and an inner resilient inflation is located within the shell. The upper end of the teat cup is applied to the cow's teat while the lower end of the teat cup is connected to a source of vacuum. In addition, the annular space between the inflation and the shell is alternately exposed to atmospheric pressure and vacuum which applies a pulsating action to the inflation to thereby alternately squeeze and release the cow's teat.

It has been found that by increasing the weight of the teat cup, the speed of milking can be increased. In addition, a weighted teat cup will also aid in crimping the teat cup hose and sealing off the vacuum line after the teat cup has been removed or has fallen from the teat. After the teat cup has either fallen from the teat due to the operation of an automatic release mechanism or has been removed manually from the teat, the teat cup will hang freely and the added weight will aid in crimping the vacuum line over the nipple which extends upwardly from the milker to thereby prevent the loss of vacuum in the system.

In the past, weights have been applied to the inner surface of the teat cup shell. However, the addition of an auxiliary weight has not proven entirely satisfactory from a sanitary standpoint, because in the event of a leak in the inflation, the milk will contact the weight, tending to corrode the same and will also lodge in the joint between the weight and the shell.

The present invention is directed to an improved teat cup shell which is formed of a clear, transparent plastic having a weight completely imbedded in its upper end. The shell is formed by a novel two-step molding process in which a portion of the shell is initially molded around the weight to partially imbed the weight, and the initially molded portion of the shell is then employed to support and align the weight within the mold cavity for the second stage molding operation. As the shell is formed of a thermoplastic material, the heat of the liquid thermoplastic resin in the second molding stage will contact and tend to melt the thermoplastic of the first molded section along the interface to thereby provide a fused or welded joint between the two separately molded sections.

As the weight is fully enclosed within the plastic material, the problems of corrosion of the weight are eliminated. Furthermore, there are no exposed joints between the weight and the shell where milk and other foreign material can lodge and thus the cleaning or sanitizing operation is simplified. The outer surface of the thermoplastic shell is molded with smooth edges and corners so that no sharp projections appear on the outer surface of the shell which could mar or scratch the milker when the teat cup is hanging freely.

As the shell itself is molded of a clear, transparent plastic, the dairymen can readily see the action of the inflation and also determine whether an inflation is leaking.

Other objects and advantages will appear in the course of the following description:

The drawings illustrate the best mode presently contemplated of carrying out the invention.

Figure 1:
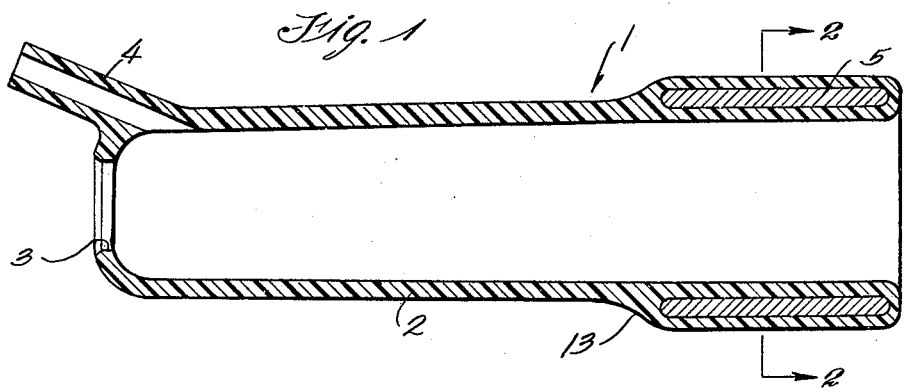
FIG. 1 is a longitudinal section of the teat cup shell of the invention.
Figure 2:
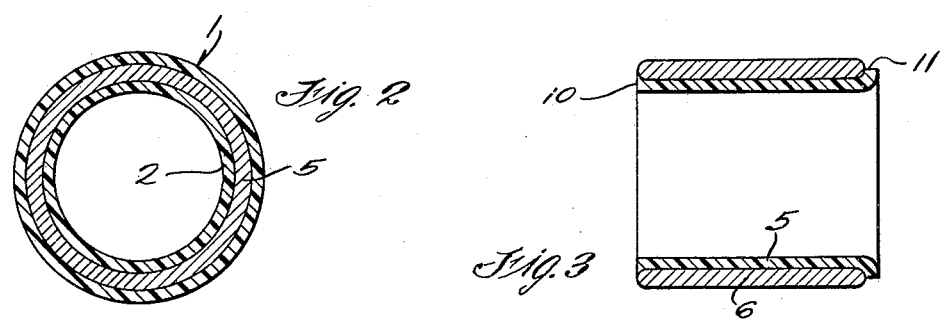
FIG. 2 is a transverse section taken along line 2—2 of FIG. 1.

FIGS. 1 and 2 illustrate a teat cup shell 1 which includes a generally cylindrical body portion 2 having an outlet opening 3 in the lower end. In addition, a nipple 4 is molded integrally with the body portion 2 and is adapted to be connected by a hose to a pulsator on the milking apparatus. A resilient inflation, not shown, is adapted to be located within the shell 1, and the pulsator alternately applies a vacuum and atmospheric pressure in the annular space between the inflation and the shell 1 in a conventional manner.

According to the invention, an annular, metal weight 5 is molded in the upper end of the shell 1 and is completely encapsulated in the plastic of the shell.

The shell 1 is molded from a clear, transparent thermoplastic resin. It has been found that polycarbonate resin, such as that sold by the General Electric Co. under the tradename Lexan, is a particularly satisfactory material for molding the shell 1. Polycarbonate resins are polymeric combinations of bisphenols linked together through carbonate linkages and are manufactured by either the ester exchange between a diallyl carbonate and a dihydroxy aromatic compound, or by the phosgenation of a dihydroxy aromatic compound.

The annular weight 5 can be formed of any relatively heavy material such as carbon steel or the like. As the weight is completely enclosed in the plastic shell 1, there is no danger of corrosion of a metal weight.

The imbedded weight 5 cooperates with the transparent shell 1 to provide a unit which has definite advantages over prior art shells. The thermoplastic shell 1, in itself, is relatively lightweight compared to a normal stainless steel shell. However, the weight 5 which is enclosed within the shell provides the necessary weight for the shell, as well as concentrating the weight in the desired location. The added weight serves not only to increase the milking speed, but also aids in more effectively crimping the lower end of the inflation over the nipple which projects upwardly from the milker when the teat cup is removed from the cow's teat and is hanging freely from the milker.

Figure 3:
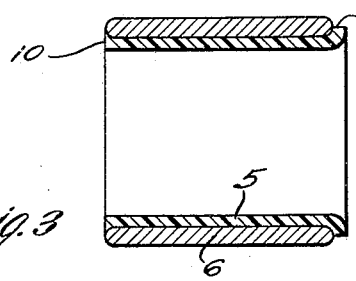
FIG. 3 is a longitudinal section of the molded section produced in the first molding step.
Figure 4:
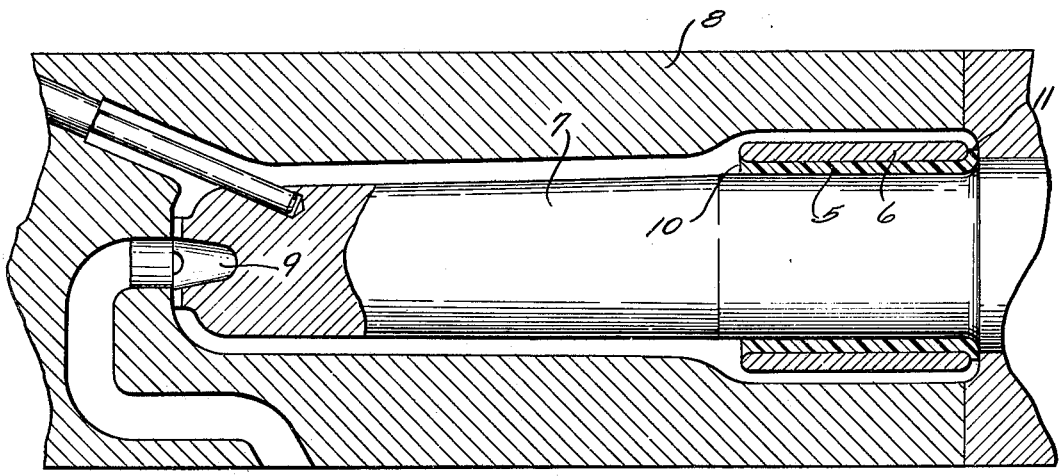
FIG. 4 is a longitudinal section of the mold employed in the second molding step.

The shell 1 is fabricated by a novel two-step molding operation which encapsulates the metal weight and yet no apertures are present in the final molded article which expose the weight to the atmosphere. According to the molding procedure, a portion of the shell 1 is initially molded to the inner wall of the weight 5 to provide a first molded section 6, as shown in FIG. 3. This annular, first molded section 6 extends from the upper end of the weight 5 to the lower end of the weight. It is not essential that the molded section 6 have the precise configuration shown in FIG. 3, but it is necessary that the molded section 6 be of sufficient size and be positioned so that when solidified it can support the weight 5 within the mold cavity in preparation for molding the remainder of the shell 1.

After the section 6 has solidified, the section is slipped over a core 7 and is positioned within a mold 8. An aligning pin 9 is inserted within the end of the core 7 and serves to position the core, as well as the weight 5, in spaced relation to the walls of the mold cavity. When the resin is introduced into the mold cavity through the hollow aligning pin 9, the liquid resin will contact the surfaces 10 and 11 of the first molded section 6 and tend to melt or fuse the resin at the interface. This results in a fusion or welding of the pre-molded section 6 with the resin introduced into the mold cavity with the result that an integral shell 1 is provided which has no visible parting line between the original molded section 6 and the portion molded in the second operation. Moreover, as the section 6 serves to support the weight 5 in the proper location within the mold cavity, there are no apertures or openings through which the weight 5 is exposed to either the atmosphere or to the interior of the shell. As the weight is completely encapsulated, there is no danger of corrosion of the weight during service, nor are there any exposed joints to collect foreign material.

The shell 1 being formed of a clear plastic has decided advantages over the conventional shell formed of stainless steel or the like. As the shell is transparent the operator can see the operation of the inflation and can also determine if an inflation is leaking and needs replacement.

As the shell 1 is a molded article, the shoulder or step 13 which merges the weighted portion of the shell to the body section 2 can be formed without sharp edges or corners, and this prevents the possibility of scratching or marring of the milker when the teat cup is hanging free.

Various modes of carrying out the invention are contemplated as being within the scope of the following claims particularly pointing out and distinctly claiming the subject matter which is regarded as the invention.

I claim:
1. A method of molding a transparent teat cup shell having an annular weight embedded therein, said weight having an inner annular surface and an outer annular surface, comprising the steps of molding a thermoplastic resin to the inner annular surface of the weight with the outer annular surface being exposed, solidifying the resin to provide a first molded section, positioning the weight and the first molded section on a core member within a mold, said core member extending through said annular weight and said first molded section being in contact with the core member and said outer annular surface being spaced out of contact with an outer wall member of the mold, introducing a thermoplastic resin into the space and into contact with the first molded section to provide a second molded section, said resin being at a temperature sufficient to melt the contacting surfaces of the first molded section and thereby fuse the joint between the first and second molded sections, and solidifying the resin of said second molded section to provide an integral shell completely encapsulating said weight.

References Cited

UNITED STATES PATENTS

| 2,705,816 | 4/1955 | Sampson | 264—254 |
| 3,097,060 | 7/1963 | Sullivan | 18—30 |
| 3,159,701 | 12/1964 | Herter | 18—36 |
| 3,247,550 | 4/1966 | Haines | 264—275 X |

ROBERT F. WHITE, Primary Examiner

K. J. HOVET, Assistant Examiner

U.S. Cl. X.R.

18—36; 264—267, 275